United States Patent
Workman et al.

(10) Patent No.: US 7,685,507 B2
(45) Date of Patent: Mar. 23, 2010

(54) SYSTEM FOR EDITING QUERY CONDITIONS, CALCULATIONS, FORMULAS AND EQUATIONS

(75) Inventors: Daniel B. Workman, Belmont, MA (US); James M. Meadors, Lincoln, MA (US); Katarina Obradovic, Somerville, MA (US); Robert B. Alexander, Waltham, MA (US); Hendrik van den Broek, North Billerica, MA (US); Dominique Vonarburg, Arlington, MA (US); Karen B. Gold, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 933 days.

(21) Appl. No.: 09/766,949

(22) Filed: Jan. 22, 2001

(65) Prior Publication Data

US 2002/0099743 A1 Jul. 25, 2002

(51) Int. Cl.
*G06F 17/00* (2006.01)
*G06F 17/30* (2006.01)

(52) U.S. Cl. ............... 715/205; 715/208; 715/221; 715/272; 707/4

(58) Field of Classification Search ........... 715/505, 715/507, 530, 538, 501.1, 764, 808, 780, 715/843, 845, 205, 207, 208, 221, 223, 206, 715/272, 222, 224, 225, 226, 267; 345/968; 707/1, 4, 102, 2, 100
See application file for complete search history.

(56) References Cited

U.S. PATENT DOCUMENTS

| | | | |
|---|---|---|---|
| 5,163,130 A | | 11/1992 | Hullot |
| 5,471,613 A | * | 11/1995 | Banning et al. ............. 707/4 |
| 5,897,649 A | * | 4/1999 | Kennedy ................ 715/538 |
| 5,909,678 A | * | 6/1999 | Bergman et al. ............ 707/4 |
| 5,977,969 A | * | 11/1999 | DiAngelo ................ 345/780 |
| 6,029,200 A | * | 2/2000 | Beckerman et al. ......... 709/226 |
| 6,084,585 A | * | 7/2000 | Kraft et al. ............... 345/733 |
| 6,122,647 A | * | 9/2000 | Horowitz et al. .......... 715/513 |
| 6,137,488 A | * | 10/2000 | Kraft et al. ............... 715/866 |
| 6,154,750 A | | 11/2000 | Roberge et al. |
| 6,157,936 A | | 12/2000 | Mutschler, III et al. |
| 6,209,006 B1 | * | 3/2001 | Medl et al. ............. 715/501.1 |
| 6,216,139 B1 | * | 4/2001 | Listou ................. 715/505 |

(Continued)

FOREIGN PATENT DOCUMENTS

WO    WO 98/44695    10/1998

OTHER PUBLICATIONS

Foldoc, "URL", Feb. 17, 2000, pp. 1-2, http://foldoc.org/index.cgi?query=URL.*

(Continued)

*Primary Examiner*—Adam L Basehoar

(57) ABSTRACT

Editing query conditions, calculations, formulas and equations, or any other parts of a form includes providing a hyperlink for an element in the form to indicate to a user that a control is available for the element. Upon a selection of the hyperlink by the user, the control is presented for user interaction. Upon completion of user interaction with the control, the element is replaced with a new element responsive to user action. The control can be a list of choices, such as a pull-down menu, a dialog box, or a text entry field. The hyperlink can be color coded and underlined.

45 Claims, 3 Drawing Sheets

U.S. PATENT DOCUMENTS

| | | | | |
|---|---|---|---|---|
| 6,374,275 | B2* | 4/2002 | Wasilewski | 715/259 |
| 6,496,803 | B1* | 12/2002 | Seet et al. | 705/14 |
| 6,589,290 | B1* | 7/2003 | Maxwell et al. | 715/507 |
| 6,639,610 | B1* | 10/2003 | Sponheim et al. | 715/760 |
| 6,654,737 | B1* | 11/2003 | Nunez | 707/3 |
| 6,816,855 | B2* | 11/2004 | Hartel et al. | 707/4 |
| 6,826,593 | B1* | 11/2004 | Acharya et al. | 709/203 |
| 6,848,077 | B1* | 1/2005 | McBrearty et al. | 715/501.1 |
| 2002/0019844 | A1* | 2/2002 | Kurowski et al. | 709/201 |
| 2004/0001109 | A1* | 1/2004 | Blancett et al. | 345/843 |
| 2004/0044743 | A1* | 3/2004 | Monell et al. | 709/217 |
| 2005/0216861 | A1* | 9/2005 | Hurewitz et al. | 715/822 |

OTHER PUBLICATIONS

Dynamic Drive, "Drop down menu generator", Mar. 30, 1999, pp. 1-2, http://web.archive.org/web/20010801161507/http://www.dynamicdrive.com/dynamicindex1/dropmenuindex.htm.*

Dynamic Drive Screenshot, "Drop down menu generator", Mar. 30, 1999, pp. 1.*

HTML 4.01 Specification, Chapter 17, "Forms", W3C, Dec. 24, 1999, pp. 1-26, http://www.w3.org/TR/html401/interact/forms.html.*

American National Standards Institute, Inc., "*American National Standard for Information Systems—Database Language—SQL*", ANSI X3.135, pp. 1-14 (1986).

Information on Using the Code Editor, "*Using the Code Editor*", pp. 1-3, http://msdn.microsoft.com/library/devprods/vs6/vbasic/vbcon98/vbconusingcodeeditor.html (downloaded May 23, 2001).

HTML 4.01 Specification, Chapter 12, "Links" World Wide Web Consortium http://www.w3.org/TR/1999/REC-html401-19991224/struct/links.html, pp. 1-15, (Downloaded May 23, 2001).

* cited by examiner

SYSTEM FOR EDITING QUERY CONDITIONS, CALCULATIONS, FORMULAS AND EQUATIONS

BACKGROUND

On computer systems, specifying a query condition or calculation frequently requires selecting from a list of valid options to fill specific roles in a query condition or calculation. For example, conditions frequently take the form of <Variable><Operator><Variable/Value>, for example, "Sales >Costs."

User interfaces frequently present such an equation using a series of drop-down list boxes or other controls to select from the valid list of choices to fill each of the positions in the equation. Alternatively, applications often allow users to edit equations by simply entering the information in a text entry box, which can be both difficult, since the user is not given any guidance, and very error prone.

SUMMARY

In an embodiment of the present invention, keywords in query conditions and calculations, or other parts of a form, can be represented as hyperlinks by means of color coding and formatting. For example, text might be blue and underlined to match user expectations resulting from web browsing experience. Clicking on the hyperlink can display an appropriate control, in context, for editing the value of the clicked term. The control might be, for example, a list of valid choices or an text entry box for entering text. The original term can then be replaced by the selected choice or entered value.

One advantage of the new solutions is that equations can be presented in a familiar, easily readable form, and edited in place. It is not necessary to present a series of controls that require substantially more screen real estate, and that often make it harder to read the equation.

Usability tests have shown that while users do not initially understand what the links are for, once they do understand how to use the links, users find using the links to be a very easy and natural way to edit equations. Compared to simply editing the text of an equation, these solutions provide much more guidance because the format of the equation can be provided. In addition, there is less room for error, because modifications can be restricted to valid alternatives.

The solution is an elegant combination of a well known interface convention, i.e, clicking on hyperlinks, to perform a new task, i.e., editing equations or other parts of a form. It allows an equation to be presented in a simple, readable format, while maintaining its editability.

Accordingly, a method for editing query conditions, calculations, formulas and equations, or any other parts of a form includes providing a hyperlink for an element in the form to indicate to a user that a control is available for the element. Upon a selection of the hyperlink by the user, the control is presented for user interaction.

In one embodiment, upon completion of user interaction with the control, the element is replaced with a new element responsive to user action.

The form can be, but is not limited to, a database query or a spreadsheet.

The element can be, for example, part of a calculation.

The control can be, but is not limited to, a list of choices, such as a pull-down menu, a dialog box, or a text entry field.

Finally, in one embodiment, the hyperlink is color coded and underlined.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views.

DETAILED DESCRIPTION

Figure 1:
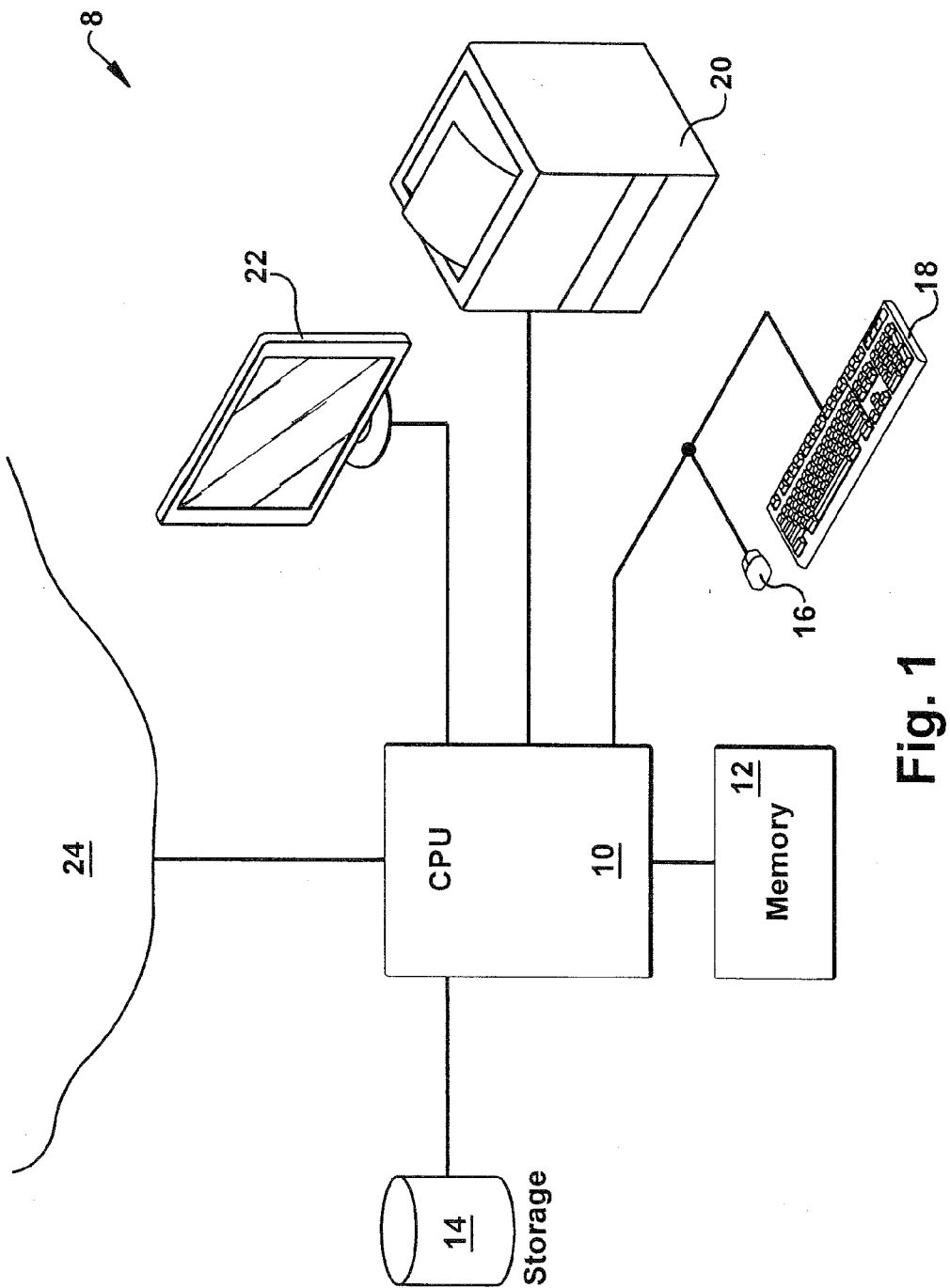
FIG. 1 is a block diagram of a typical computer system which has been simplified for the sake of discussion.

FIG. 1 is a block diagram of a typical computer system 8, which has been simplified for the sake of discussion. A processor 10 is typically connected to volatile memory 12 which maybe external or internal to the CPU 10. The CPU 10 is also typically connected to one or more storage media 14 such as hard disks, floppy disks, CD-ROMs and tape drives. Often a database is stored on the mass storage 14.

The CPU 10 is typically also connected to user input devices such as a mouse 16 and a keyboard 18. These allow a user to input information and enter request such as database queries to the computer 10.

Output devices can include, for example, a printer 20 and a monitor 22.

Finally, a CPU 10 may be connected to other computers over a network 24 such as a local area network (LAN) or the internet.

Figure 2:
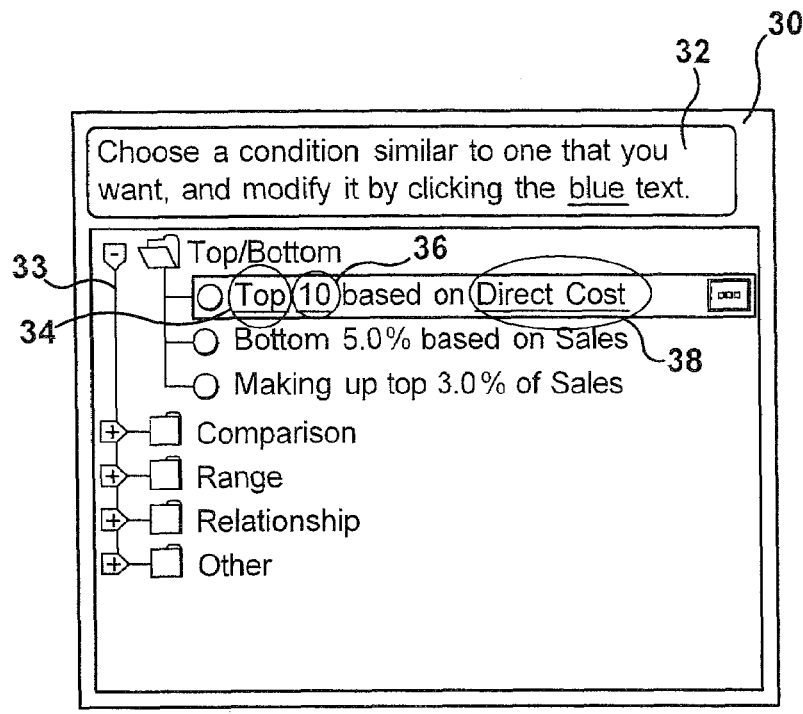
FIG. 2 is a screen shot which illustrates the present invention.

FIG. 2 is a screen shot which illustrates the present invention. The screen shot 30 includes an instruction area 32 which indicates to a user that the user should choose a condition similar to the condition that the user desires. The user is also instructed to modify the selected condition by clicking the blue underlined text.

Below the instruction 32, is a tree structure 33. A highlighted line illustrates a condition which the user has selected. There are three "links" in this condition: the descriptor "Top" 34, the value "10" 36 and the variable "Direct Cost"38.

Figure 3:
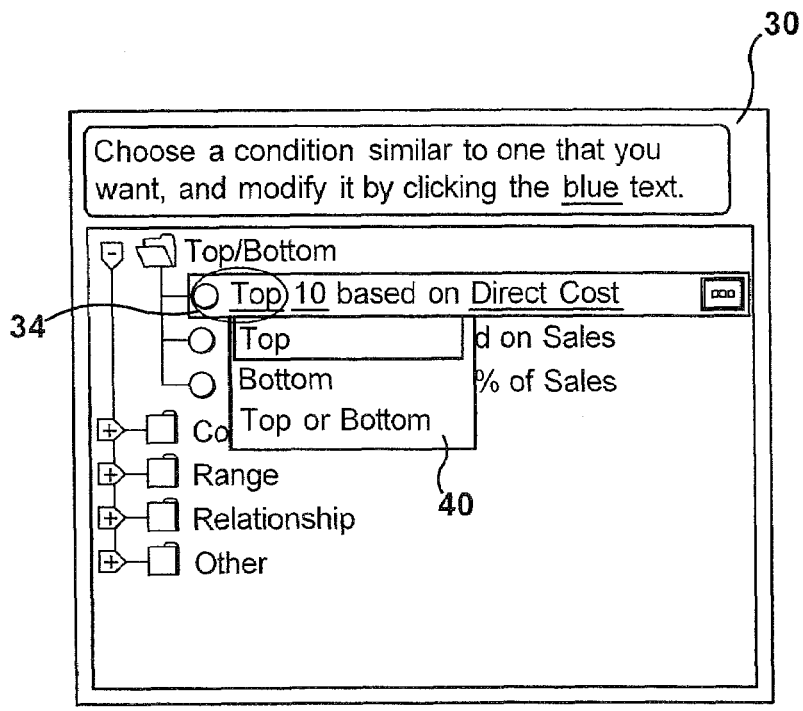
FIG. 3 illustrates the screen of FIG. 2 after the user has clicked on the "Top" link.

FIG. 3 illustrates the screen shot 30 after the user has clicked on the "Top" link 34. In this particular example, a pull-down menu 40 appears, providing a list of valid choices to the user. These choices include "Top," "Bottom" and "Top or bottom." After selecting one of these choices, the selected choice will replace the existing link. For example, if the user selects "Bottom," the menu 40 will disappear and the highlighted line will now read "Bottom 10 based on Direct Cost." The "Top" link 40 is replaced by a "Bottom" link (not shown), which would typically, but not necessarily, bring up the same menu 40.

Figure 4:
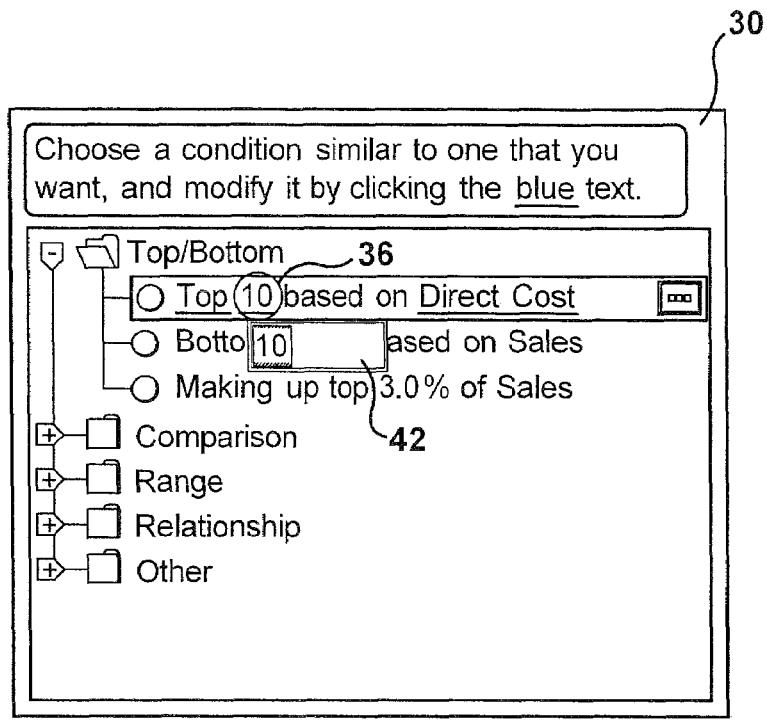
FIG. 4 illustrates the screen of FIG. 2 after the user selects the "10" link.

FIG. 4 similarly illustrates a screen shot 30 when the user selects the second link "10"36. In this particular example, a text entry box 42 appears. This allows the user to enter any numeric value. Note that only numbers can be entered in this particular case, thus lowering the possibility of an error that could occur in free-form text entry.

Figure 5:
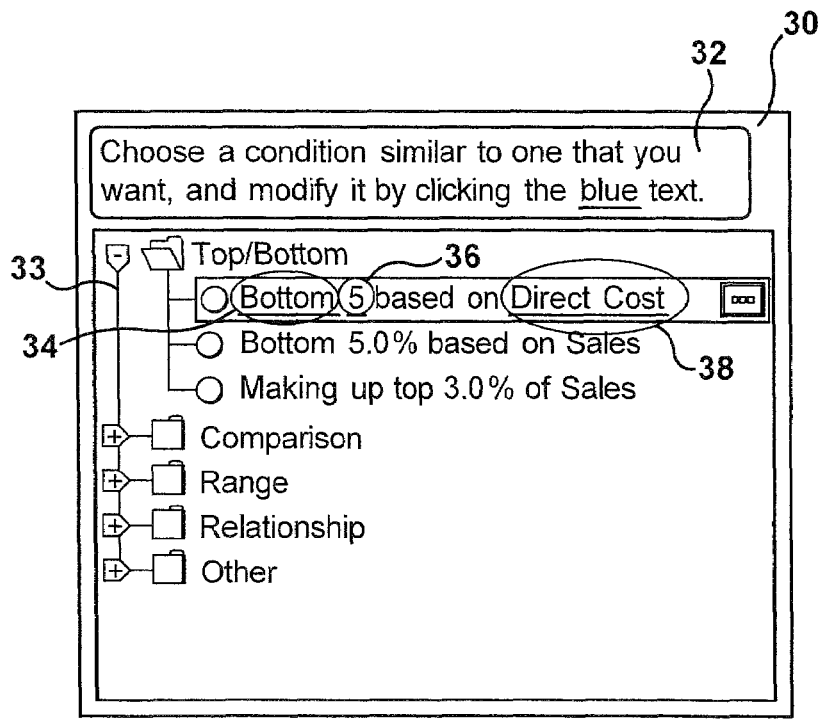
FIG. 5 illustrates the screen of FIG. 2 after the user has selected "Bottom" and entered "5".

FIG. 5 illustrates the screen of FIG. 2 after the user has selected "Bottom" in the pulldown menu 40 of FIG. 3 and entered "5" in the text entry box 42 of FIG. 4. Note how the contents of the affected hyperlinks 34, 36 has changed according to the user's selections.

In similar fashion, when the user clicks on the "Direct Cost" link 38, a pull down menu of valid variables (not shown) appears.

Of course, these controls are exemplary. Other controls are equally possible. For example, a dialog for setting up some configuration might appear in response to selection of a link. The link is used to indicate to the user that a control is available.

The links of the present invention may appear, for example, in a form, or a form letter. They can be used to edit a query into a database, stored for example, on mass storage 14, or to edit a spreadsheet or some calculation. In a particular embodiment, the text of the link is color coded and underlined. Alternatively, the text may be highlighted in some other manner.

As another example of the applicability of the present method, in composing a web page or other hypertext document using HTML or some other paging language, for a given tag, all valid parameters that can be used with the tag can be listed in a hyperlinked control. Furthermore, a form letter could have hyperlinked pull-down menus for a title where "Mr.," "Mrs.," "Ms.," "Miss" and "Dr." are options, as well as for the closing where options can be, for example, "Sincerely," "Very truly yours," etc.

It will be apparent to those of ordinary skill in the art that methods involved in the present system for editing query conditions, formulas and equations may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to particular embodiments thereof, it will be understood by those skilled in the art that various changes in form and details may be made therein without departing from the scope of the invention encompassed by the appended claims.

What is claimed is:

1. A computer-implemented method in which a computer system initiates execution of software instructions stored in memory for editing a form calculation, the computer-implemented method comprising:
    displaying a hyperlink for an element in the form calculation, the form calculation being a database query and the form calculation including a mathematical formula, displaying the hyperlink to indicate to a user that a control is available for the element, the hyperlink including at least one hyperlink target, the hyperlink target identified by a link to a choice satisfying the element on the form calculation, the hyperlink providing one of the group consisting of
        (i) a link from the form calculation to another location, wherein the another location is identified by a reference to valid variables in the hyperlink target and
        (ii) a link from the form calculation to another file, wherein the another file is identified by a reference to a selection of choices in the hyperlink target;
    upon a selection of the hyperlink by the user, presenting the control for user interaction, the control displaying a list of choices satisfying the element in the form calculation;
    receiving a selection from the list of choices; and
    upon completion of user interaction with the control and in response to receiving the selection, replacing the element with a new element corresponding to the selection, displaying the hyperlink for the new element in the form calculation, and causing the presented control to disappear.

2. The computer-implemented method of claim 1, wherein the list of choices is a pull-down menu.

3. The computer-implemented method of claim 1, wherein the control is a dialog box.

4. The computer-implemented method of claim 1, wherein the control is a text entry field.

5. The computer-implemented method of claim 1, wherein presenting the control for user interaction includes selecting the control from the group consisting of a dialog box, a list, and a text entry field.

6. The computer-implemented method of claim 1, wherein displaying the hyperlink for the element in the form calculation includes displaying the hyperlink using color coding and formatting to distinguish the hyperlink from other parts of the form calculation that do not have a hyperlink.

7. The computer-implemented method of claim 5, further comprising:
    displaying an instruction area that presents instructions for the user to click on the element in the form calculation displayed as a hyperlink to modify the element.

8. The computer-implemented method of claim 7, wherein displaying the hyperlink for the element in the form calculation includes displaying multiple form calculations as a tree structure.

9. The computer-implemented method of claim 7, further comprising:
    upon the selection of the hyperlink by the user, highlighting a corresponding condition in the form calculation.

10. The computer-implemented method of claim 9, further comprising:
    upon the selection of the hyperlink by the user, displaying a dialog for setting up configuration of the database query.

11. The computer-implemented method of claim 10, wherein selecting the control as the text entry field for user interaction includes restricting text entry to numeric values for numeric elements.

12. A computer system for editing a form calculation, the system comprising:
    a processor;
    a memory unit that stores instructions associated with an application executed by the processor; and
    an interconnect coupling the processor and the memory unit; enabling the computer system to execute the application and perform operations of:
        displaying a user interface for displaying information to a user and for accepting input from the user;
        displaying a hyperlink on the user interface for an element in the form calculation, the form calculation being a spreadsheet and the form calculation including a mathematical formula, displaying the hyperlink to indicate to the user that a control is available for the element, the hyperlink including at least one hyperlink target, the hyperlink target identified by a link to a choice satisfying the element on the form calculation, the hyperlink providing one of the group consisting of
            (i) a link from the form calculation to another location, wherein the another location is identified by a reference to valid variables in the hyperlink target and (ii) a link from the form calculation to another file, wherein the another file is identified by a reference to a selection of choices in the hyperlink target;

upon a selection of the hyperlink by the user, displaying the control on the user interface for user interaction, the control including a list of choices satisfying the element in the form calculation;

receiving a selection from the list of choices through the user interface: and upon completion of user interaction with the control, and in response to receiving the selection, replacing the element with a new element corresponding to the selection, displaying the hyperlink for the new element in the form calculation, and causing the control to disappear from view.

13. The computer system of claim 12, wherein the list of choices is a pull-down menu.

14. The computer system of claim 12, wherein the control is a dialog box.

15. The computer system of claim 12, wherein the control is a text entry field.

16. The computer system of claim 12, wherein the control displayed on the user interface for user interaction includes selecting the control from the group consisting of a dialog box, a list, and a text entry field.

17. The computer system of claim 12, wherein the hyperlink displayed on the user interface for the element in the form calculation includes the hyperlink displayed using color coding and formatting to distinguish the hyperlink from other parts of the form calculation that do not have a hyperlink.

18. The computer system of claim 16, further comprising an instruction area displayed that presents instructions for the user to click on the element in the form calculation displayed as a hyperlink to modify the element.

19. The computer system of claim 18, wherein the hyperlink displayed on the user interface for the element in the form calculation includes displaying multiple form calculations as a tree structure.

20. The computer system of claim 18, further comprising:
upon the selection of the hyperlink by the user, a corresponding condition in the form calculation being highlighted.

21. The computer system of claim 20, further comprising:
upon the selection of the hyperlink by the user, a dialog for setting up configuration of the spreadsheet being displayed.

22. The computer system of claim 21, wherein the control selected as the text entry field for user interaction includes text entry being restricted to numeric values for numeric elements.

23. A computer program product for editing a form calculation, the form calculation being a database query, the computer program product comprising a computer readable memory device having computer readable code stored thereon for processing data information such that the code, when executed by a processing device, causes the processing device to perform the operations of:

displaying a hyperlink for an element in the form calculation, the form calculation being a database query and the form calculation including a mathematical formula, displaying the hyperlink to indicate to a user that a control is available for the element, the hyperlink including at least one hyperlink target, the hyperlink target identified by a link to a choice satisfying the element on the form calculation, the hyperlink providing one of the group consisting of (i) a link from the form calculation to another location, wherein the another location is identified by a reference to valid variables in the hyperlink target and (ii) a link from the form calculation to another file, wherein the another file is identified by a reference to a selection of choices in the hyperlink target;

upon a selection of the hyperlink by the user, presenting the control for user interaction, the control displaying a list of choices satisfying the element in the form calculation;

receiving a selection from the list of choices; and upon completion of user interaction with the control and in response to receiving the selection, replacing the element with a new element corresponding to the selection, displaying the hyperlink for the new element in the form calculation, and causing the presented control to disappear.

24. The computer program product of claim 23, wherein the list of choices is a pull-down menu.

25. The computer program product of claim 23, wherein the control is a dialog box.

26. The computer program product of claim 23, wherein the control is a text entry field.

27. The computer program product of claim 23, wherein program code which presents the control for user interaction includes program code which selects the control from the group consisting of a dialog box, a list, and a text entry field.

28. The computer program product of claim 23, wherein program code which displays the hyperlink for the element in the form calculation includes program code which displays the hyperlink using color coding and formatting to distinguish the hyperlink from other parts of the form calculation that do not have a hyperlink.

29. The computer program product of claim 27, further comprising program code which:
displays an instruction area that presents instructions for the user to click on the element in the form calculation displayed as a hyperlink to modify the element.

30. The computer program product of claim 29, wherein program code which displays the hyperlink for the element in the form calculation includes program code which displays multiple form calculations as a tree structure.

31. The computer program product of claim 29, further comprising program code which:
upon the selection of the hyperlink by the user, highlights a corresponding condition in the form calculation.

32. The computer program product of claim 31, further comprising program code which:
upon the selection of the hyperlink by the user, displays a dialog for setting up configuration of the database query.

33. The computer program product of claim 32, wherein program code which selects the control as the text entry field for user interaction includes program code which restricts text entry to numeric values for numeric elements.

34. A computer-implemented method in which a computer system initiates execution of software instructions stored in memory for editing a form calculation, the computer-implemented method comprising:

displaying a pre-formatted form calculation that includes displaying a hyperlink for an element in the form calculation, the form calculation being a database query and including a mathematical equation, displaying the hyperlink to indicate to a user that a control is available for the element, the hyperlink including at least one hyperlink target, the hyperlink target identified by a link to a choice satisfying the element on the form calculation, the hyperlink providing a link from the form calculation to another location, wherein the another location is identified by a reference to a list of valid variables in the form calculation;

responsive to selection of the hyperlink by the user, presenting the control for user interaction, the control displaying the list of valid variables, each valid variable for selection in the list of valid variables being presented without a hyperlink;

receiving a selection of a valid variable from the list of valid variables; and upon completion of user interaction with the control and in response to receiving the selection, replacing the element with a new element corresponding to the selection of the valid variable, displaying the hyperlink for the new element in the form calculation, and causing the presented control to disappear.

35. The method of claim 34, wherein displaying the pre-formatted form calculation includes:

displaying a second hyperlink for a second element in the form calculation, the form calculation including a mathematical equation, displaying the second hyperlink to indicate to a user that a control is available for the second element, the second hyperlink including at least one second hyperlink target, the second hyperlink target identified by a second link to a choice satisfying the second element on the form calculation, the second hyperlink providing a link from the form calculation to a second another location, wherein the second another location is identified by a reference to a list of valid operators in the form calculation;

responsive to selection of the second hyperlink by the user, presenting the control for user interaction, the control displaying the list of valid operators for the mathematical equation, each operator for selection in the list being presented without a hyperlink;

receiving a selection of a valid operator from the list of valid operators; and upon completion of user interaction with the control and in response to receiving the selection of a valid operator, replacing the second element with a second new element corresponding to the selection of the valid operator, displaying the second hyperlink for the second new element in the form calculation and causing the presented control to disappear.

36. The method of claim 35, wherein presenting the control for user interaction includes selecting the control from the group consisting of a dialog box, a pull-down menu, and a text entry field.

37. The method of claim 35, further comprising:
displaying an instruction area that presents instructions for the user to click on the element in the form calculation displayed as a hyperlink to modify the element.

38. The method of claim 37, further comprising:
upon the selection of the hyperlink by the user, highlighting a corresponding condition in the form calculation.

39. The method of claim 38, further comprising:
upon the selection of the hyperlink by the user, displaying a dialog for setting up configuration of the database query.

40. A computer program product for editing a form calculation, the form calculation being a database query, the computer program product comprising a computer readable memory device having computer readable code stored thereon for processing data information such that the code, when executed by a processing device, causes the processing device to perform the operations of:

displaying a pre-formatted form calculation that includes displaying a hyperlink for an element in the form calculation, the form calculation being a database query and including a mathematical equation, displaying the hyperlink to indicate to a user that a control is available for the element, the hyperlink including at least one hyperlink target, the hyperlink target identified by a link to a choice satisfying the element on the form calculation, the hyperlink providing a link from the form calculation to another location, wherein the another location is identified by a reference to a list of valid variables in the form calculation;

responsive to selection of the hyperlink by the user, presenting the control for user interaction, the control displaying the list of valid variables, each valid variable for selection in the list of valid variables being presented without a hyperlink;

receiving a selection of a valid variable from the list of valid variables; and upon completion of user interaction with the control and in response to receiving the selection, replacing the element with a new element corresponding to the selection of the valid variable, displaying the hyperlink for the new element in the form calculation, and causing the presented control to disappear.

41. The computer program product of claim 40, wherein code that displays the pre-formatted form calculation includes:

displaying a second hyperlink for a second element in the form calculation, the form calculation including a mathematical equation, displaying the second hyperlink to indicate to a user that a control is available for the second element, the second hyperlink including at least one second hyperlink target, the second hyperlink target identified by a second link to a choice satisfying the second element on the form calculation, the second hyperlink providing a link from the form calculation to a second another location, wherein the second another location is identified by a reference to a list of valid operators in the form calculation;

responsive to selection of the second hyperlink by the user, presenting the control for user interaction, the control displaying the list of valid operators for the mathematical 6quation, each operator for selection in the list being presented without a hyperlink;

receiving a selection of a valid operator from the list of valid operators; and upon completion of user interaction with the control and in response to receiving the selection of a valid operator, replacing the second element with a second new element corresponding to the selection of the valid operator, displaying the second hyperlink for the second new element in the form calculation and causing the presented control to disappear.

42. The computer program product of claim 41, wherein program code which presents the control for user interaction includes program code which selects the control from the group consisting of a dialog box, a list, and a text entry field.

43. The computer program product of claim 42, further comprising program code which:
displays an instruction area that presents instructions for the user to click on the element in the form calculation displayed as a hyperlink to modify the element.

44. The computer program product of claim 43, further comprising program code which:
upon the selection of the hyperlink by the user, highlights a corresponding condition in the form calculation.

45. The computer program product of claim 44, further comprising program code which:
upon the selection of the hyperlink by the user, displays a dialog for setting up configuration of the database query.

* * * * *

UNITED STATES PATENT AND TRADEMARK OFFICE
CERTIFICATE OF CORRECTION

| | | |
|---|---|---|
| PATENT NO. | : 7,685,507 B2 | Page 1 of 1 |
| APPLICATION NO. | : 09/766949 | |
| DATED | : March 23, 2010 | |
| INVENTOR(S) | : Daniel B. Workman et al. | |

It is certified that error appears in the above-identified patent and that said Letters Patent is hereby corrected as shown below:

In column 1, line 31, delete "an" and insert -- a --, therefor.

In column 4, line 50, in Claim 12, delete "unit;" and insert -- unit, --, therefor.

In column 7, line 46, in Claim 37, delete "claim 35," and insert -- claim 36, --, therefor.

In column 8, line 38, in Claim 41, delete "6quation," and insert -- equation, --, therefor.

Signed and Sealed this
First Day of March, 2011

David J. Kappos
*Director of the United States Patent and Trademark Office*